United States Patent [19]
Le et al.

[11] Patent Number: 5,174,418
[45] Date of Patent: Dec. 29, 1992

[54] WHEEL LOCK MECHANISM FOR A WHEELCHAIR

[75] Inventors: Son H. Le; James B. Papac, both of Fresno, Calif.

[73] Assignee: Fortress Lite-Style Inc., Clovis, Calif.

[21] Appl. No.: 618,726

[22] Filed: Nov. 27, 1990

[51] Int. Cl.⁵ ............................................... B60T 1/04
[52] U.S. Cl. ..................... 188/2 F; 188/74; 280/20.1
[58] Field of Search ............ 188/2 F, 20, 74; 280/250.1, 304.1; 297/DIG. 4; 403/3, 4

[56] References Cited

U.S. PATENT DOCUMENTS

| | | | |
|---|---|---|---|
| 4,560,049 | 12/1985 | Uchibaba et al. | 188/196 M |
| 4,570,756 | 2/1986 | Minnebraker et al. | 188/2 F |
| 4,749,064 | 6/1988 | Jinno et al. | 188/2 F |
| 4,838,387 | 6/1989 | Yoshigai | 188/24.22 |
| 4,887,830 | 12/1989 | Fought et al. | |
| 4,989,890 | 2/1991 | Lockhard et al. | 280/304.1 |

OTHER PUBLICATIONS

Copy of two photographs showing a prior art wheel lock mechanism prior to Nov. 1990.

*Primary Examiner*—Matthew C. Graham
*Assistant Examiner*—Chris Schwartz
*Attorney, Agent, or Firm*—Reed Smith Shaw & McClay

[57] ABSTRACT

A wheelchair wheel lock system is provided that can be adapted for either pull-to-lock or push-to-lock operation. The wheel lock system includes a function plate with first and second pivot holes. An operating lever is attached to the function plate, and rotation of the lever causes rotation of the function plate and thereby moves a contact arm into engagement with the wheel of the wheelchair to lock the wheel against movement. The operation of the wheel lock system is changed between push-to-lock and pull-to-lock by adapting the function plate to rotate about either the first pivot hole or the second pivot hole. The operating lever can be attached to the function plate in a variety of orientations, providing added flexibility in the operation of the wheel lock system.

3 Claims, 3 Drawing Sheets

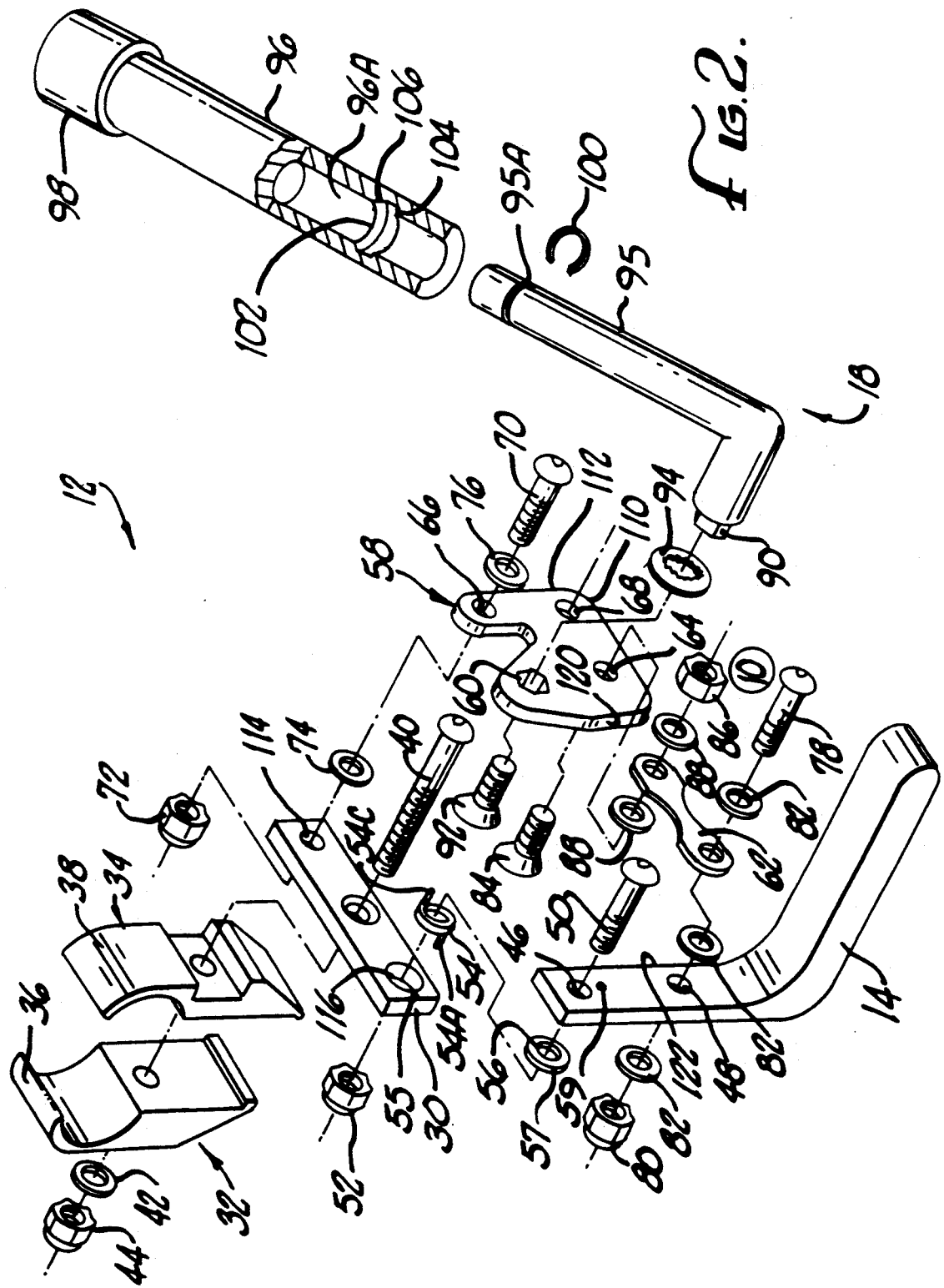

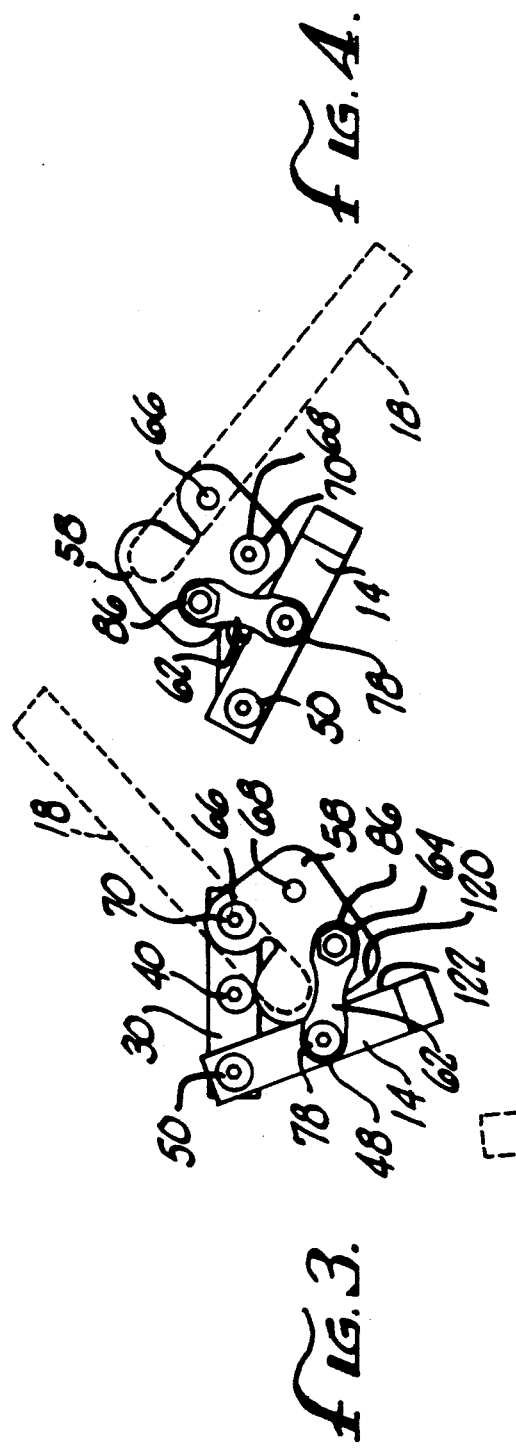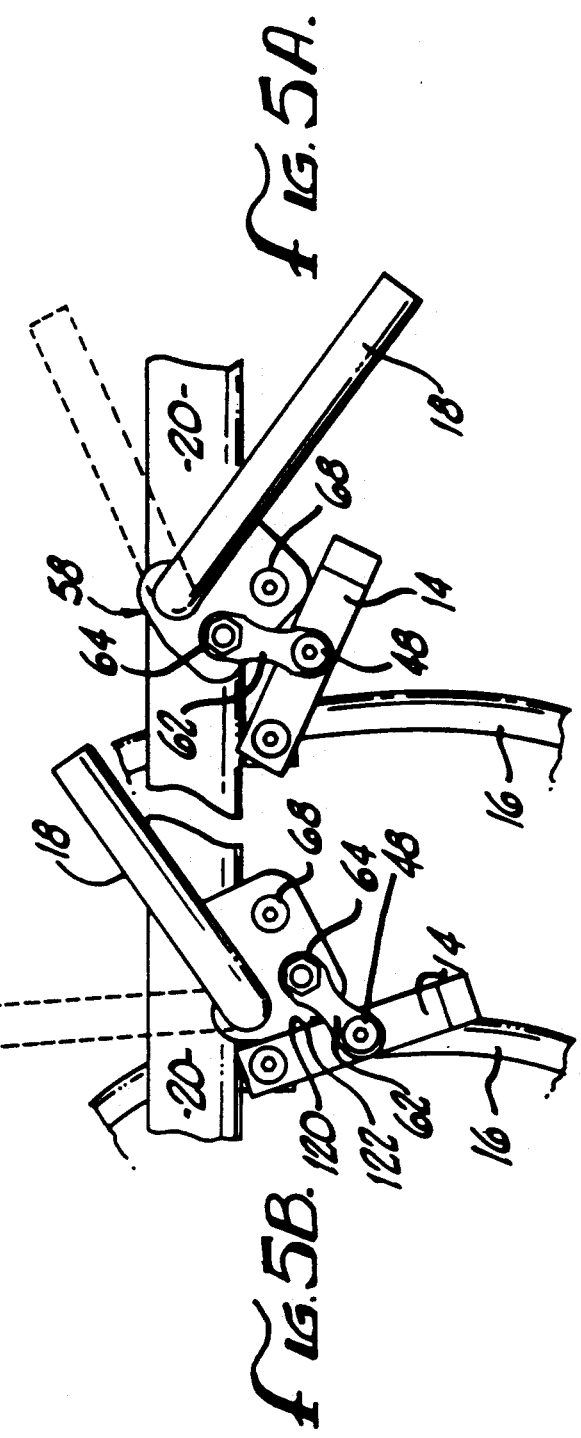

WHEEL LOCK MECHANISM FOR A WHEELCHAIR

BACKGROUND OF THE INVENTION

This invention relates generally to wheel lock systems for use with wheelchairs and, more particularly, to lock systems that can lock a wheel of a wheelchair by motion of an operating lever in either one of two selectable directions.

Wheelchairs typically include wheel lock systems that can be used to lock one of the wheels of the wheelchair to hold the wheelchair in a fixed position. For more forceful and satisfying operation, a wheelchair wheel lock system should have an operating lever with positive engagement and good force multiplication. Most wheelchair wheel lock systems incorporate a mechanical linkage that effectively multiplies the force applied through the operating lever to provide secure wheel locking with a precise, positive operating feel, but many require physical abilities that some wheelchair occupants do not possess.

Due to particular arm strengths or disabilities, wheelchair occupants sometimes find they can only exert either a pushing motion or a pulling motion to engage the wheel lock system. Such occupants might also have a limited range of movement that allows them to move the operating lever over a restricted range in either direction. Conventional wheelchair wheel lock systems, however, often are designed for locking engagement in only one of the two directions of handle motion and cannot change the range of motion necessary for wheel locking. Thus, a wheelchair wheel lock system might be designed to be engaged by a pushing motion on the operating lever, while a wheelchair occupant might be limited to arm movement with strength in a pulling motion. To accommodate the widest population of wheelchair occupants, manufacturers must provide some wheelchairs with wheel lock systems configured for pull-to-lock operation and must provide others with push-to-lock operation. This causes increased production and inventory costs and can make it difficult for hospitals and supply agencies to ensure they have an adequate selection.

Wheelchair wheel lock systems have been proposed that allow either a pushing or pulling motion to engage the brake. Such dual-action systems provide increased flexibility and do not require increased inventory, but can be rather complicated and expensive to manufacture. If the cost of manufacturing the wheelchair wheel lock system is too high, it can be just as cost effective for the manufacturer to provide an inventory of wheelchairs with single-action lock systems separately capable of pushing motions and pulling motions. In addition, some wheel lock systems that provide the option of push-to-lock or pull-to-lock action may not provide a positive feel due to the complicated linkage, or can be somewhat difficult to switch between the two. One double action system is shown in Jinno et al. U.S. Pat. No. 4,749,064. Examples of typical single direction locking mechanisms are shown by Fought et al. U.S. Pat. No. 4,887,830 and Minnebraker et al. U.S. Pat. No. 4,570,756.

From the foregoing discussion, it should be apparent that there is a need for a wheelchair wheel lock system whose operating lever is selectable to operate in either a pushing or pulling motion and can accommodate wheelchair occupants with restricted strength in one direction of movement, while providing a mechanism that is simple and relatively inexpensive to manufacture. The present invention satisfies this need.

SUMMARY OF THE INVENTION

The present invention is embodied in a wheelchair wheel lock system having a relatively simple and direct mechanism in which the lock engagement motion can be selected between either a pulling motion or a pushing motion of the system's operating lever, and can be changed between the two by simply changing the pivot axis of a function plate. Rotation of the operating lever causes rotation of the function plate and thereby moves a contact arm into engagement with a wheel of the wheelchair to lock the wheel against movement. The operating angle of the lever can be varied to accommodate a wheelchair occupant with restricted motion, and the lever can include a telescoping portion that provides added leverage. The lever can be constructed with a cylindrical cross-section for easier and more comfortable actuation. Because the wheel lock system can be easily changed between push-to-lock and pull-to-lock operation, inventory requirements are reduced. The wheel lock system in accordance with the present invention provides a simple, relatively direct linkage between the operating lever and the contact arm and produces a precise, positive feel during operation, with smooth actuation, good force multiplication, and strong wheel locking force. Because the mechanism is simply constructed, it is also relatively inexpensive to manufacture and very durable.

In accordance with the present invention, the wheelchair wheel lock system includes a function plate that is pivotably mounted in one of two configurations to produce either a push-to-lock or pull-to-lock operation. In most cases, there is no requirement for both push and pull actuation to be simultaneously available. Therefore, the wheel lock system in accordance with the present invention provides whichever arrangement best suits a particular wheelchair occupant, while providing a highly reliable, low maintenance mechanism. The wheel lock system includes a cylindrical telescoping operating lever, a contact arm, a linkage bar, and a function plate that is rotatable under control of the lever to drive the linkage bar and force the contact arm into an engaged or disengaged position. The function plate is pivotably mounted to rotate about one of two different pivot holes and provide either a push-to-lock or pull-to-lock operation. The system can include a coiled return spring to provide a return torque to the wheel lock mechanism. Thus, the wheelchair wheel lock system in accordance with the present invention provides the flexibility of either pull-to-lock or push-to-lock operation, a relatively simple mechanism with fewer parts for easier production and a more solid feel, and a reduced inventory requirement for wheel lock systems with push operation and pull operation.

Other features and advantages of the present invention should be apparent from the following description of the preferred embodiment, taken in conjunction with the accompanying drawings, which illustrate, by way of example, the principles of the invention.

BRIEF DESCRIPTION OF THE DRAWINGS

A better understanding of the invention may be had from a consideration of the following Detailed Description, taken in conjunction with the accompanying drawings in which:

FIG. 2 is an exploded perspective diagram, partly broken away, of the wheel lock system shown in FIG. 1;

FIG. 3 is a side view of the wheel lock system illustrated in FIG. 2 in the push-to-lock configuration.

FIG. 4 is a side view of the wheel lock system illustrated in FIG. 2 in the pull-to-lock configuration;

FIG. 5A is a side view of the wheel lock system illustrated in FIG. 4 showing the adjustable lever in the unlocked position; and FIG. 5B is a side view of the wheel lock system illustrated in FIG. 4 showing the adjustable lever in the locked position.

DESCRIPTION OF THE PREFERRED EMBODIMENT

Figure 1:
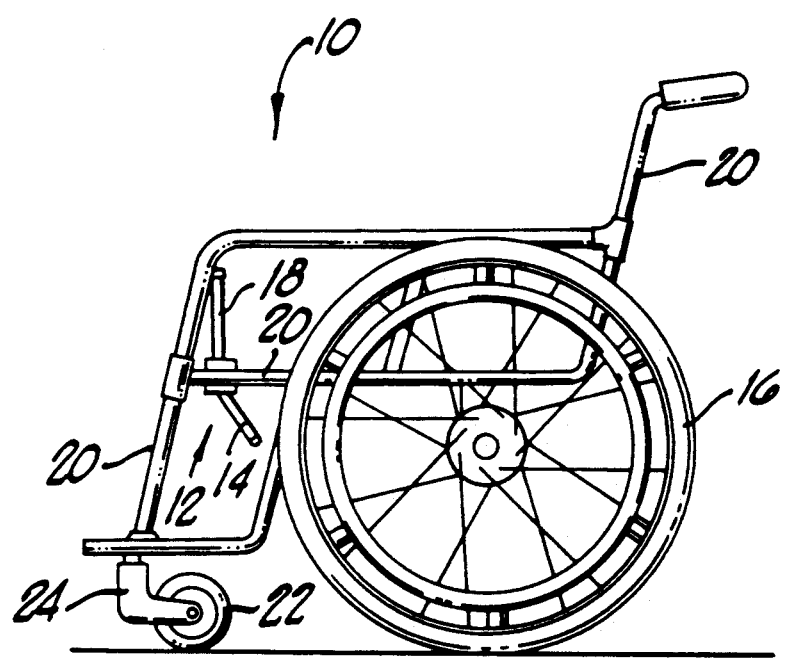
FIG. 1 is a side view of a wheelchair having mounted thereon a reversible lever motion wheel lock system in accordance with the present invention.

A wheelchair 10 shown in FIG. 1 includes a wheel lock system 12 in accordance with the invention. The wheel lock system 12 has a contact arm 14 that may be moved against a rear wheel 16 of the wheelchair to lock it in position in response to selectable movement of an operating lever 18 with either a pushing or pulling motion relative to the wheelchair occupant. The wheelchair includes a frame 20 to which is attached a pair of large diameter rear wheels such as the one wheel 16 shown in side view, and also a pair of smaller diameter front wheels 22. The front wheels are attached to the frame by a caster arrangement 24 to provide steering direction for the wheelchair. The wheel lock system 12 can be installed on the frame 20 such that the operating lever 18 can be activated by either pushing away from the wheelchair occupant or pulling toward the wheelchair occupant, and therefore can accommodate wheelchair occupants with limited movement. This reduces the inventory requirements of manufacturers for providing such accommodation.

The construction of the wheel lock system 12 illustrated in FIG. 1 is more easily seen in the exploded perspective view of the wheel lock system shown in FIG. 2. A mounting bracket 30 is mounted to the wheelchair frame 20 by a first clamping shell 32 and a second clamping shell 34 that each include curved portions 36 and 38, respectively, which clamp around the wheelchair frame. The first and second clamping shells are held together, and the bracket 30 is attached to them, by a clamping bolt 40 secured by a washer 42 and clamping nut 44.

The contact arm 14 pivots with respect to the mounting bracket 30 into and out of engagement with the large diameter rear wheel 16, which is shown in FIG. 1. The contact arm includes a pivot hole 46 and a linkage hole 48, and pivots about the pivot hole by a pivot bolt 50 that passes through the hole and the bracket 30 and is secured by a nut 52. A coiled spring 54 fits around the pivot bolt and is attached to an intermediate washer 56 and the attachment nut 52 so as to provide a return action for the contact arm 14. The return action makes it easier and more convenient to use the wheel lock system and assures that the contact arm 14 does not unintentionally engage the wheel 16.

The coiled spring 54 terminates at one end in an axially extending portion 54A that matingly engages a bore 55 in the mounting bracket 30. The spring 54 terminates at its opposite end in an axially-extending portion 54C that passes through a bore 56 in a washer 57 to matingly engage a hole 59 in the contact arm 14. The spring 54 may thus rotationally bias the contact arm 14 relative to the wheel 16.

The wheel lock system 12 can be adapted to either a push-to-lock or pull-to-lock operation by means of a function plate 58. The function plate includes an upper pivot hole 66 and a lower pivot hole 68 that alternatively define a pivot axis of the function plate and determine whether the wheel lock system has a pull-to-lock or a push-to-lock action. The function plate is coupled to the operating lever 18 by means of a multi-sided receiving hole 60 that receives one end of the lever, and is connected to the contact arm 14 by a linkage bar or plate 62 through a linkage connect hole 64 in the function plate 58. The function plate 58 rotates about a function plate pivot bolt 70 that is passed through either the upper or lower function plate pivot hole 66 or 68, respectively, and through the mounting plate 30, to be secured thereto by a pivot nut 72. Intermediate washers 74 and 76 provide smooth pivoting action. Rotation of the operating lever 18 rotates the function plate 58, driving the linkage plate 62 to rotate the contact arm 14 into locking engagement with the wheel 16 as the contact arm engages the wheel.

FIG. 3 shows the wheel lock system 12 assembled in the push-to-lock configuration. The operating lever 18 is shown in phantom by dashed lines for clarity. FIG. 3 illustrates that, in the push-to-lock configuration, the function plate 58 is attached to the mounting plate 30 at the upper pivot hole 66 by the pivot bolt 70, while the lower pivot hole 68 is not used. The linkage plate 62 is attached to the contact arm 14 by a contact arm bolt 78 that is secured by a nut 80 and rotates freely with the aid of intermediate washers 82. The linkage plate 62 is attached to the function plate 58 by a function plate screw 84 and a function plate nut 86, with free movement provided by intermediate washers 88.

When the operating lever 18 is pushed, the function plate 58 rotates clockwise about the upper pivot hole 66 until the centers of the pivot hole 66, linkage connect hole 64, and the contact arm linkage hole 48 become substantially linearly aligned. At this point the contact arm 14 has a maximum rotation. The operating lever 18 and function plate 58 may then continue to rotate a short distance as the wheel lock system 12 "snaps through center" a short distance until a left edge 120 of the function plate 58 engages a stop edge 122 of the contact arm 14 in a stable position.

To change the wheel lock system 12 from the FIG. 3 push-to-lock configuration into a pull-to-lock operation, it is only necessary to change the function plate pivot hole used from that illustrated in FIG. 3 into the configuration illustrated in FIG. 4, and then reposition the system on the wheelchair frame 20 to ensure proper engagement of the contact arm 14 with the rear wheel 16. Again, the operating lever 18 is shown in phantom by dashed lines for clarity. FIG. 4 shows that the function plate 58 pivots counter-clockwise about the lower hole 68 with respect to the mounting plate 30 by means of the pivot bolt 70, while the upper pivot hole 66 is not used. The wheel lock system 12 must be repositioned slightly on the frame 20 because the throw of the contact arm 14 changes when the function plate pivot is changed. The extent of repositioning necessary is well within the abilities of one skilled in the art. In all other respects, the wheel lock system 12 of FIG. 4 is just as shown in FIG. 3. That is, the contact arm 14 is coupled to the function plate 58 by a linkage plate 62 and pivots about axes defined by the function plate nut 86 and the contact arm bolt 78.

The operation of the wheel lock system 12 can be better understood by making further reference to FIG. 5B, which shows the pull-to-lock configuration of FIG. 4 after counter-clockwise rotation to the locked position of FIG. 5B. In the unlocked position (FIGS. 4, 5A), the contact arm 14 is positioned away from the large diameter rear wheel 16. In the locked position shown in FIG. 5B, the operating lever 18 has been pulled upward, pivoting the function plate 58 about the bolt 70, which operates through the linkage plate 62 to move the contact arm 14 into locking engagement with the rear wheel 16. A firm engagement with the rear wheel can then be obtained, locking the wheel in position.

FIG. 5B illustrates the wheel lock system 12 after rotation through the maximum force alignment point wherein the holes 68, 64 and 48 are linearly aligned. As shown in FIG. 5B, the left edge 120 of the function plate 58 engages the stop edge 122 of the contact arm 14 and additional force is required to rotate the function plate 58 counter-clockwise toward the unlock position of FIG. 4. The wheel lock system 12 thus provides a center-stable locking position.

In addition to changing between push-to-lock and pull-to-lock configurations, a wheelchair wheel lock system in accordance with the present invention includes an adjustable operating lever 18 whose range of operational movement in either configuration can be changed to substantially suit the particular range desired by the wheelchair occupant. This feature is better understood with reference to FIGS. 2, 5A, and 5B. The lever arm hole 60 in the function plate 58 is keyed to the operating lever 18 by virtue of having a polygonal opening that mates with a matching polygonal pattern on the end of the lever to be inserted into the hole 60. In the disclosed embodiment the polygonal shaped key is a hexagon. The lever is fixed relative to the function plate by an attachment screw 90 and a lock washer 92. Thus, the operating lever 18 can be removed from the function 58 plate and then rotated relative to the function plate so as to place the lever in a different angular orientation relative to the function plate regardless of whether the wheel lock system is in the pull-to-lock or push-to-lock configuration.

The change in the operating lever 18 angular orientation is best understood by referring to FIGS. 5A and 5B, which show that in either the unlocked position of FIG. 5A or the locked position of FIG. 5B, the lever 18 can be moved from a first orientation shown in solid lines to a second orientation shown in dashed lines without moving the contact arm 14. This change in angular orientation is achieved by removing the attachment screw 92, pulling the lever 18 out of the attachment hole 60, rotating the lever arm so that it fits back into the hole in a different angular orientation, and then attaching the arm to the function plate 58 by the screw 92. The hexagonal configuration of the operating lever 18 and the receiving hole 60 allow the operating lever to be easily mounted in any one of six positions relative to the function plate 58 and therefore allow flexibility in mounting the lever in the position most convenient for the wheelchair occupant.

A further feature of the wheel lock system is illustrated in FIG. 2, which shows that the operating lever 18 can be provided with a multi-segmented telescoping extension portion 96 that provides an extensible length to the lever. If the wheelchair occupant should require or desire greater leverage, the lever can be extended and force can be applied from the rubberized lever tip 98. Whether or not the operating lever is provided with a telescoping portion, the lever is advantageously provided with a circular cross-section. This makes the lever easier and more comfortable to grasp and to apply torque against.

A radially inner portion 95 of the operating lever 18 has a circumferential groove 95A that receives and supports a c-shaped retainer ring 100. The ring is a resilient metal spring that rests loosely within the groove 95A with its outer circumference extending outside the groove 95A. The radially outer extension portion 96 has an internal axially extending bore 96A that allows the extension portion to be pushed over the inner portion 95, and with the bore 96A receiving the portion 95, the ring 100 is resiliently compressed until it reaches a groove 102 in the inside surface of the bore 96A. The groove 102 has an orthogonal edge 104 that prevents the outer portion 96 from being extended past the ring 100 once the ring has entered the groove 102. The groove 102 also has a tapered edge 106 which provides a detent action as the outer portion 96 is forced onto the inner portion 95 with the ring 100 passing out of the groove 102 and into the bore 96A. The frictional engagement between the ring 100 and the bore 96A creates a drag that tends to resist relative motion between the outer portion 96 and the inner portion 95.

A wheelchair wheel lock system has been described that can be placed in either a pull-to-lock or push-to-lock configuration, using a simple mechanism that provides a solid feel and precise engagement. The need for maintaining an inventory of wheelchairs with both pull-to-lock and push-to-lock wheel lock systems becomes unnecessary, and the simple mechanism provides greater reliability, increased durability, and a more precise operating field.

Some of the dimensions of the wheel lock system elements and their proportions relative to one another have been found to be critical in obtaining the selectable push-to-lock or pull-to-lock configurations with proper mechanical force leverage and travel distances. With reference to FIG. 2, for the purpose of establishing dimensional relationships, a lower edge 110 and right hand edge 112 of the function plate 58 are used as reference edges.

In the preferred embodiment shown, the center of the linkage connect hole 64 in the function plate 58 is positioned 0.350 inch above the lower edge 110 and 0.700 inch to the left of the center of the lower pivot hole 68. The center of the lower pivot hole 68 is positioned 3.350 inch above the lower edge 110, in line with the linkage connect hole 64 and 0.400 inch to the left of the right edge 112. The center of the upper pivot hole 66 is positioned 0.300 inch to the left of the right edge 112 and 0.675 inch above the center of the lower pivot hole 68. The center of the handle receiving hole 60 should be about equally spaced from the upper and lower pivot, holes 66 and 68, and is positioned 0.925 inch above the lower edge 110 and 1.075 inches left of the right edge 112.

The mounting bracket 30 has a function plate pivot hole 114 near the right hand side thereof and a brake arm pivot hole 116 near the left hand end. These two pivot holes are spaced apart center-to-center 1.560 inch, with a central attachment hole 115 located 1.160 inch to the left of the mounting bracket's right edge. The holes in the linkage plate 62 have a center-to-center spacing of 0.900 inch and the pivot hole 46 and linkage connection hole 48 of the contact arm 14 have a center-to-center spacing of 0.981 inch. It is to be understood that the dimensions above relate to the illustrated embodiment only. Those skilled in the art will appreciate that it is possible to depart somewhat from these dimensions, while generally maintaining the relative proportions, and still obtain the benefits of the invention.

The present invention is described above in terms of a presently preferred embodiment so that an understanding of the present invention can be conveyed. There are, however, many configurations for wheel lock systems not specifically described herein, but with which the present invention is applicable. The present invention should therefore not be seen as limited to the particular embodiment described herein, but rather, it should be understood that the present invention has applicability with respect to wheel lock systems in a variety of applications. All modifications, variations or equivalent arrangements that are within the scope of the attached claims should therefore be considered to be within the scope of the invention.

We claim:

1. A wheelchair wheel lock comprising:
 a mounting bracket adapted to secure the wheel lock to a wheelchair in operating relationship with a wheel on the wheelchair;
 a function plate having different first and second pivot points, the function plate being secured to the mounting bracket at one of the pivot points and being pivotable about the one pivot point;
 a contact arm pivotably secured to the bracket and being pivotable between positions of engagement and disengagement relative to the wheelchair wheel;
 a handle secured to the function plate to facilitate manual rotation of the function plate; and
 a bar link having a first end pivotably secured to the function plate and an opposite second end pivotably secured to the contact arm such that clockwise and counterclockwise rotation of the function plate causes a respective corresponding rotation of the contact arm into and out of engagement with the wheelchair wheel with the relative correspondence between the direction of function plate rotation and the contact arm direction of rotation being different for each of the first and second pivot points, depending upon which point is selected to pivotably mount the function plate to the bracket.

2. A wheelchair wheel lock system comprising:
 a contact arm that can be moved into and out of engagement with a wheel of a wheelchair to lock the wheel from movement;
 an operating lever that can be moved in a first selectable direction and an opposite, second selectable direction to move the contact arm into engagement with the wheel;
 a mounting plate attached to the wheelchair and to which the contact arm is coupled;
 a function plate having a lever hole, a linkage hole, and first and second pivot holes;
 a pivot bolt; and
 a linkage plate coupled to the function plate and to the contact arm;
 wherein the function plate is coupled to the linkage plate by means of the linkage hole and is coupled to the operating lever by means of the lever hole, and that rotates the contact arm in the first direction for engagement when the pivot bolt is passed through the first pivot hole and rotates the contact arm in the second direction for engagement when the pivot bolt is passed through the second pivot hole.

3. A wheelchair wheel lock system comprising:
 a contact arm that can be moved into and out of engagement with a wheel of a wheelchair to lock the wheel from movement; and
 a pivotable operating lever, couplable to the contact arm at at least one pivot point to move the arm into engagement with the wheel, having an attachment portion defining the axis about which the lever pivots and a grasping portion attached to the attachment portion, wherein the operating lever has a cylindrical cross-section, and the operating lever, while coupled to the contact arm by a coupling means at a first pivot point, is movable in a first selectable direction to move the contact arm into engagement with the wheel and, while coupled to the contact arm by said coupling means at a second pivot point, is movable in an opposite, second selectable direction, to move the contact arm into engagement with the wheel.

* * * * *